US 8,274,569 B2
Sep. 25, 2012

(12) United States Patent
Lapstun et al.

(54) PRINTING SYSTEM UTILIZING CARTRIDGE PRE-STORED WITH IDENTIFIERS WITH IDENTIFYING PRINTED PAGES

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 116 days.

(21) Appl. No.: 12/954,892

(22) Filed: Nov. 28, 2010

(65) Prior Publication Data

US 2011/0069354 A1 Mar. 24, 2011

Related U.S. Application Data

(63) Continuation of application No. 10/965,933, filed on Oct. 18, 2004, now abandoned, which is a continuation-in-part of application No. 09/608,920, filed on Jun. 30, 2000, now Pat. No. 6,831,682.

(30) Foreign Application Priority Data

Jun. 30, 1999 (AU) ...................................... PQ1313

(51) Int. Cl.
 *H04N 5/225* (2006.01)
 *G06F 3/12* (2006.01)
 *B41J 2/175* (2006.01)
(52) U.S. Cl. .......................... 348/207.2; 358/1.1; 347/86
(58) Field of Classification Search ............... 348/207.2, 348/231.3; 358/1.1, 1.8; 347/2, 86, 101; 235/462.1, 494
See application file for complete search history.

(56) References Cited

U.S. PATENT DOCUMENTS

| 4,637,051 | A | | 1/1987 | Clark |
| 4,864,618 | A | | 9/1989 | Wright et al. |
| 5,051,736 | A | | 9/1991 | Bennett et al. |
| 5,477,012 | A | | 12/1995 | Sekendur |
| 5,486,686 | A | * | 1/1996 | Zdybel et al. ................ 235/375 |
| 5,506,617 | A | | 4/1996 | Parulski |
| 5,652,412 | A | | 7/1997 | Lazzouni et al. |
| 5,661,506 | A | | 8/1997 | Lazzouni et al. |
| 5,692,073 | A | | 11/1997 | Cass |
| 5,699,091 | A | | 12/1997 | Bullock et al. |
| 5,780,831 | A | | 7/1998 | Seo et al. |
| 5,794,094 | A | | 8/1998 | Boockholdt et al. |
| 5,797,061 | A | | 8/1998 | Overall et al. |
| 5,850,418 | A | | 12/1998 | Van De Kerkhof |

(Continued)

FOREIGN PATENT DOCUMENTS

EP 0848540 6/1998

(Continued)

OTHER PUBLICATIONS

U.S. Appl. No. 11/198,497, filed Jul. 27, 1999, Nomura, Reiko.

(Continued)

*Primary Examiner* — Nhan T Tran

(57) ABSTRACT

A printer system for printing pages belonging to an interactive page system includes a cartridge comprising a data storage area in which is pre-stored a range of identifiers, each identifier being unique throughout the interactive page system; and a printer comprising an interface for receiving the cartridge, a reader for reading an identifier from the range of pre-stored identifiers, a coded data generator for generating a page identifier from the identifier, and a printing mechanism for printing the page identifier onto a page. The reader reads a previously unread identifier from the range of identifiers each time the coded data generator is to generate a page identifier.

17 Claims, 13 Drawing Sheets

U.S. PATENT DOCUMENTS

| | | | |
|---|---|---|---|
| 5,852,434 A | 12/1998 | Sekendur | |
| 5,894,326 A | 4/1999 | McIntyre et al. | |
| 5,896,403 A | 4/1999 | Nagasaki et al. | |
| 5,903,607 A | 5/1999 | Tailliat | |
| 5,903,729 A | 5/1999 | Reber et al. | |
| 5,913,019 A | 6/1999 | Attenberg | |
| 5,933,829 A * | 8/1999 | Durst et al. | 707/999.01 |
| 5,980,010 A | 11/1999 | Stephenson | |
| 6,076,734 A | 6/2000 | Dougherty et al. | |
| 6,091,909 A | 7/2000 | McIntyre et al. | |
| 6,106,110 A | 8/2000 | Gundjian et al. | |
| 6,113,208 A | 9/2000 | Benjamin et al. | |
| 6,149,325 A | 11/2000 | Nunokawa et al. | |
| 6,167,208 A | 12/2000 | Sato | |
| 6,191,815 B1 | 2/2001 | McIntyre | |
| 6,267,296 B1 | 7/2001 | Ooshima et al. | |
| 6,330,975 B1 | 12/2001 | Bunte et al. | |
| 6,330,976 B1 * | 12/2001 | Dymetman et al. | 235/487 |
| 6,331,865 B1 | 12/2001 | Sachs et al. | |
| 6,360,174 B1 * | 3/2002 | Shoki | 347/7 |
| 6,386,772 B1 | 5/2002 | Klinefelter et al. | |
| 6,426,771 B1 | 7/2002 | Kosugi | |
| 6,460,155 B1 | 10/2002 | Nagasaki et al. | |
| 6,600,571 B1 | 7/2003 | Itoh | |
| 6,612,497 B1 | 9/2003 | Iida et al. | |
| 6,618,078 B1 | 9/2003 | Budrys | |
| 6,628,333 B1 | 9/2003 | Gowda et al. | |
| 6,651,894 B2 * | 11/2003 | Nimura et al. | 235/462.01 |
| 6,674,923 B1 | 1/2004 | Shih et al. | |
| 6,711,277 B1 | 3/2004 | Cok | |
| 6,747,692 B2 * | 6/2004 | Patel et al. | 348/207.1 |
| 6,831,682 B1 | 12/2004 | Silverbrook et al. | |
| 6,879,341 B1 | 4/2005 | Silverbrook | |
| 6,916,128 B1 | 7/2005 | Petteruti et al. | |
| 6,920,606 B1 | 7/2005 | Jablonski et al. | |
| 6,963,359 B1 | 11/2005 | Aosaki et al. | |
| 6,964,374 B1 * | 11/2005 | Djuknic et al. | 235/462.01 |
| 7,050,629 B2 | 5/2006 | Jackson et al. | |
| 7,212,637 B2 | 5/2007 | Salisbury | |
| 7,229,025 B2 | 6/2007 | Sussmeier et al. | |
| 7,239,346 B1 | 7/2007 | Priddy | |
| 7,243,842 B1 | 7/2007 | Leon et al. | |
| 7,295,332 B1 | 11/2007 | Lapstun et al. | |
| 7,309,015 B2 | 12/2007 | Frantz et al. | |
| 7,538,793 B2 | 5/2009 | Silverbrook | |
| 7,663,780 B2 | 2/2010 | Lapstun | |
| 7,728,872 B2 | 6/2010 | Silverbrook | |
| 7,834,906 B2 | 11/2010 | Silverbrook et al. | |
| 7,920,166 B2 | 4/2011 | Silverbrook | |
| 8,009,196 B2 | 8/2011 | Silverbrook | |
| 2002/0002598 A1 | 1/2002 | Van Allen et al. | |
| 2002/0019784 A1 | 2/2002 | Ritz | |
| 2002/0138649 A1 | 9/2002 | Carmell et al. | |
| 2002/0141765 A1 | 10/2002 | Phillips | |
| 2002/0188860 A1 | 12/2002 | Parry et al. | |
| 2002/0196345 A1 | 12/2002 | No | |
| 2003/0029923 A1 | 2/2003 | Mizoguchi | |
| 2003/0217267 A1 | 11/2003 | Kindberg | |
| 2004/0090647 A1 | 5/2004 | Beard et al. | |
| 2004/0114023 A1 * | 6/2004 | Jacobsen et al. | 347/106 |
| 2004/0128264 A1 | 7/2004 | Leung et al. | |
| 2005/0245271 A1 | 11/2005 | Vesuna | |
| 2006/0123053 A1 | 6/2006 | Scannell, Jr. | |
| 2006/0147083 A1 | 7/2006 | Piersol et al. | |
| 2007/0210169 A1 | 9/2007 | Bhatia et al. | |

FOREIGN PATENT DOCUMENTS

| | | |
|---|---|---|
| EP | 0913989 | 5/1999 |
| GB | 2306669 A | 5/1997 |
| JP | 09-193511 | 7/1997 |
| JP | 10-013844 A | 1/1998 |
| JP | 11-007512 A | 1/1999 |
| JP | 11-095493 A | 4/1999 |
| WO | WO 95/10813 A | 4/1995 |
| WO | WO 99/18487 A2 | 4/1999 |
| WO | WO 99/50787 | 10/1999 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

PRINTING SYSTEM UTILIZING CARTRIDGE PRE-STORED WITH IDENTIFIERS WITH IDENTIFYING PRINTED PAGES

CROSS REFERENCE TO RELATED APPLICATIONS

The present application is a Continuation of Ser. No. 10/965,933 which is a Continuation-in-Part of Ser. No. 09/608,920 filed Jun. 30, 2000, now issued U.S. Pat. No. 6,831,682.

TECHNICAL FIELD

The present invention relates to cartridges containing identifiers, and in particular to printer consumable cartridges containing identifiers which may be applied to printed media.

CROSS REFERENCED APPLICATIONS

Various methods, systems and apparatus relating to the present invention are disclosed in the following granted US patents and co-pending US applications filed by the applicant or assignee of the present application: The disclosures of all of these granted US patents and co-pending US applications are incorporated herein by reference.

| | | | | |
|---|---|---|---|---|
| 6,374,354 | 10/815,621 | 7,243,835 | 10/815,630 | 10/815,637 |
| 10/815,638 | 7,251,050 | 10/815,642 | 7,097,094 | 7,137,549 |
| 10/815,618 | 7,156,292 | 10/815,635 | 10/815,647 | 10/815,634 |
| 7,137,566 | 7,131,596 | 7,128,265 | 7,197,374 | 7,175,089 |
| 10/815,617 | 10/815,620 | 7,178,719 | 10/815,613 | 7,207,483 |
| 7,296,737 | 7,270,266 | 10/815,614 | 10/815,636 | 7,128,270 |
| 10/815,609 | 7,150,398 | 7,159,777 | 10/815,610 | 7,188,769 |
| 7,097,106 | 7,070,110 | 7,243,849 | 6,416,167 | 7,204,941 |
| 7,282,164 | 10/815,628 | 6,746,105 | 10/728,784 | 10/728,783 |
| 7,156,289 | 7,178,718 | 7,225,979 | 09/575,197 | 7,079,712 |
| 6,825,945 | 7,330,974 | 6,813,039 | 7,190,474 | 6,987,506 |
| 6,824,044 | 7,038,797 | 6,980,318 | 6,816,274 | 7,102,772 |
| 09/575,186 | 6,681,045 | 6,678,499 | 6,679,420 | 6,963,845 |
| 6,976,220 | 6,728,000 | 7,110,126 | 7,173,722 | 6,976,035 |
| 6,813,558 | 6,766,942 | 6,965,454 | 6,995,859 | 7,088,459 |
| 6,720,985 | 7,286,113 | 6,922,779 | 6,978,019 | 6,847,883 |
| 7,131,058 | 7,295,839 | 09/607,843 | 09/693,690 | 6,959,298 |
| 6,973,450 | 7,150,404 | 6,965,882 | 7,233,924 | 09/575,181 |
| 09/722,174 | 7,175,079 | 7,162,259 | 6,718,061 | 10/291,523 |
| 10/291,471 | 7,012,710 | 6,825,956 | 10/291,481 | 7,222,098 |
| 10/291,825 | 7,263,508 | 7,031,010 | 6,972,864 | 6,862,105 |
| 7,009,738 | 6,989,911 | 6,982,807 | 10/291,576 | 6,829,387 |
| 6,714,678 | 6,644,545 | 6,609,653 | 6,651,879 | 10/291,555 |
| 7,293,240 | 10/291,592 | 10/291,542 | 7,044,363 | 7,004,390 |
| 6,867,880 | 7,034,953 | 6,987,581 | 7,216,224 | 10/291,821 |
| 7,162,269 | 7,162,222 | 7,290,210 | 7,293,233 | 7,293,234 |
| 6,850,931 | 6,865,570 | 6,847,961 | 10/685,523 | 10/685,583 |
| 7,162,442 | 10/685,584 | 7,159,784 | 10/804,034 | 10/793,933 |
| 6,889,896 | 10/831,232 | 7,174,056 | 7,068,382 | 7,007,851 |
| 6,957,921 | 6,457,883 | 10/743,671 | 7,094,910 | 7,091,344 |
| 7,122,685 | 7,038,066 | 7,099,019 | 7,062,651 | 6,789,194 |
| 6,789,191 | 10/900,129 | 7,278,018 | 10/913,350 | 6,644,642 |
| 6,502,614 | 6,622,999 | 6,669,385 | 6,827,116 | 6,549,935 |
| 6,987,573 | 6,727,996 | 6,591,884 | 6,439,706 | 6,760,119 |
| 7,295,332 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 7,190,491 | 10/932,044 | 6,982,798 |
| 6,870,966 | 6,822,639 | 6,474,888 | 6,627,870 | 6,724,374 |
| 6,788,982 | 7,263,270 | 6,788,293 | 6,946,672 | 6,737,591 |
| 7,091,960 | 09/693,514 | 6,792,165 | 7,105,753 | 6,980,704 |
| 6,768,821 | 7,132,612 | 7,041,916 | 6,797,895 | 7,015,901 |
| 7,289,882 | 7,148,644 | 10/778,056 | 10/778,058 | 10/778,060 |
| 10/778,059 | 10/778,063 | 10/778,062 | 10/778,061 | 10/778,057 |
| 7,096,199 | 7,286,887 | 10/917,467 | 7,324,859 | 7,218,978 |
| 10/917,436 | 10/919,379 | 7,055,739 | 7,233,320 | 6,830,196 |
| 6,832,717 | 7,182,247 | 7,120,853 | 7,082,562 | 6,843,420 |
| 10/291,718 | 6,789,731 | 7,057,608 | 6,766,944 | 6,766,945 |
| 7,289,103 | 10/291,559 | 7,299,969 | 10/409,864 | 7,108,192 |
| 7,111,791 | 7,077,333 | 6,983,878 | 10/786,631 | 7,134,598 |
| 10/893,372 | 6,929,186 | 6,994,264 | 7,017,826 | 7,014,123 |
| 7,308,148 | 10/683,151 | 10/683,040 | 10/778,090 | 6,957,768 |
| 09/575,172 | 7,170,499 | 7,106,888 | 7,123,239 | 6,982,701 |
| 6,982,703 | 7,227,527 | 6,786,397 | 6,947,027 | 6,975,299 |
| 7,139,431 | 7,048,178 | 7,118,025 | 6,839,053 | 7,015,900 |
| 7,010,147 | 7,133,557 | 6,914,593 | 10/291,546 | 6,938,826 |
| 7,278,566 | 6,593,166 | 7,132,679 | 6,940,088 | 6,795,215 |
| 7,154,638 | 6,859,289 | 6,977,751 | 6,398,332 | 6,394,573 |
| 6,622,923 | 6,747,760 | 6,921,144 | 10/884,881 | 10/854,514 |
| 6,454,482 | 6,808,330 | 6,527,365 | 6,474,773 | 6,550,997 |
| 7,093,923 | 6,957,923 | 7,131,724 | 6,536,874 | 6,666,544 |

BACKGROUND

A number of systems have been proposed in which a printed medium is imbued with an ability to support user interactions with a computer system. Such systems typically rely on coded data placed on or in the medium, ideally in inconspicuous or invisible form. The interactions are then typically mediated by a device capable of sensing and decoding the coded data and communicating the interactions to the computer system. The coded data can consist of one or more discrete barcodes, with each barcode identifying a hyperlink to related information. For example, the barcode can be a UPC barcode as described in U.S. Pat. No. 5,978,773 "System and method for using an ordinary article of commerce to access a remote computer" (F. C. Hudetz et al); it can also consist of a coded coordinate grid which allows the sensing device to generate position information relative to the medium, as variously described in U.S. Pat. No. 5,051, 736 "Optical stylus and passive digitizing tablet data input system" (W. E. Bennett et al), U.S. Pat. No. 5,477,012 "Optical position determination" (O. F. Sekendur), U.S. Pat. No. 6,330,976 "Marking medium area with encoded identifier for producing action through network" (M. Dymetman et al), and U.S. Pat. No. 6,502,756 "Recording of information" (C. Faahraeus), as well as in the present applicant's granted and co-pending applications listed above.

As described in the present applicant's U.S. Pat. No. 6,457,883, it is advantageous to include unique identifiers in the coded data, since this allows user interactions with different instances of the printed medium to be distinguished. This is true whether the coded data directly identifies one or more hyperlinks (or functions), or whether the coded data identifies one or more regions of the medium (or the entire medium). When the coded data includes a coordinate grid, it may include one or more separate identifiers to identify one or more regions of the medium to which the coordinate grid applies, or the coordinate grid may be a fragment of a larger coordinate grid, thus implicitly identifying one or more regions of the medium, e.g. as described in U.S. Pat. No. 6,502,756.

When the coded data is printed onto the medium on demand, there exists the problem of allocating one or more unique identifiers to be included in the coded data. This is particularly a problem when the identifiers are required to be globally unique but the printer does not have online access to a source of globally unique identifiers.

SUMMARY

According to an aspect of the present disclosure, a printer system for printing pages belonging to an interactive page system comprises a cartridge comprising a data storage area in which is pre-stored a range of identifiers, each identifier being unique throughout the interactive page system; and a printer comprising an interface for receiving the cartridge, a reader for reading an identifier from the range of pre-stored identifiers, a coded data generator for generating a page identifier from the identifier, and a printing mechanism for printing the page identifier onto a page. The reader reads a previously unread identifier from the range of identifiers each time the coded data generator is to generate a page identifier.

DETAILED DESCRIPTION (Note: Memjet™ is the Trademark of Silverbrook Research Pty Ltd, Australia.)

In the preferred embodiment, the invention is configured to work with the netpage system, as described in the present applicant's granted and co-pending applications listed above.

A netpage printer 601, an example of which is described in more detail below, prints interactive pages 2014 with visible graphic data and invisible coded data. The coded data for a region of a surface (e.g. the surface of a printed page) includes one or more identifiers 210 for each region and a coordinate grid for each region. A coordinate grid may be a fragment of a larger coordinate grid, and may thus implicitly identify its corresponding region (or page), i.e. without an explicit region (or page) identifier. A description of the contents of the page 2010, corresponding to at least some of the graphic data, is stored on a computer system, indexed by the corresponding region identifiers (or the page identifier).

A user typically interacts with the page using a hand-held device, such as a pen device, which is capable of sensing and decoding the coded data, and transmitting, to the computer system, data representing movement of the device relative to the coordinate grid. The computer system interprets the movement data in relation to the stored description of the page, retrieved using the region (or page) identifier accompanying the movement data. For example, the computer system may interpret the movement data as a click of a button, a check of a box, handwriting in a text field, drawing in a drawing field, or a signature in a signature field. Alternatively or additionally, the coded data may identify interactive objects, such as buttons, hyperlinks and fields, directly, allowing the computer system to interpret the movement data without reference to a stored page description.

Figure 13:
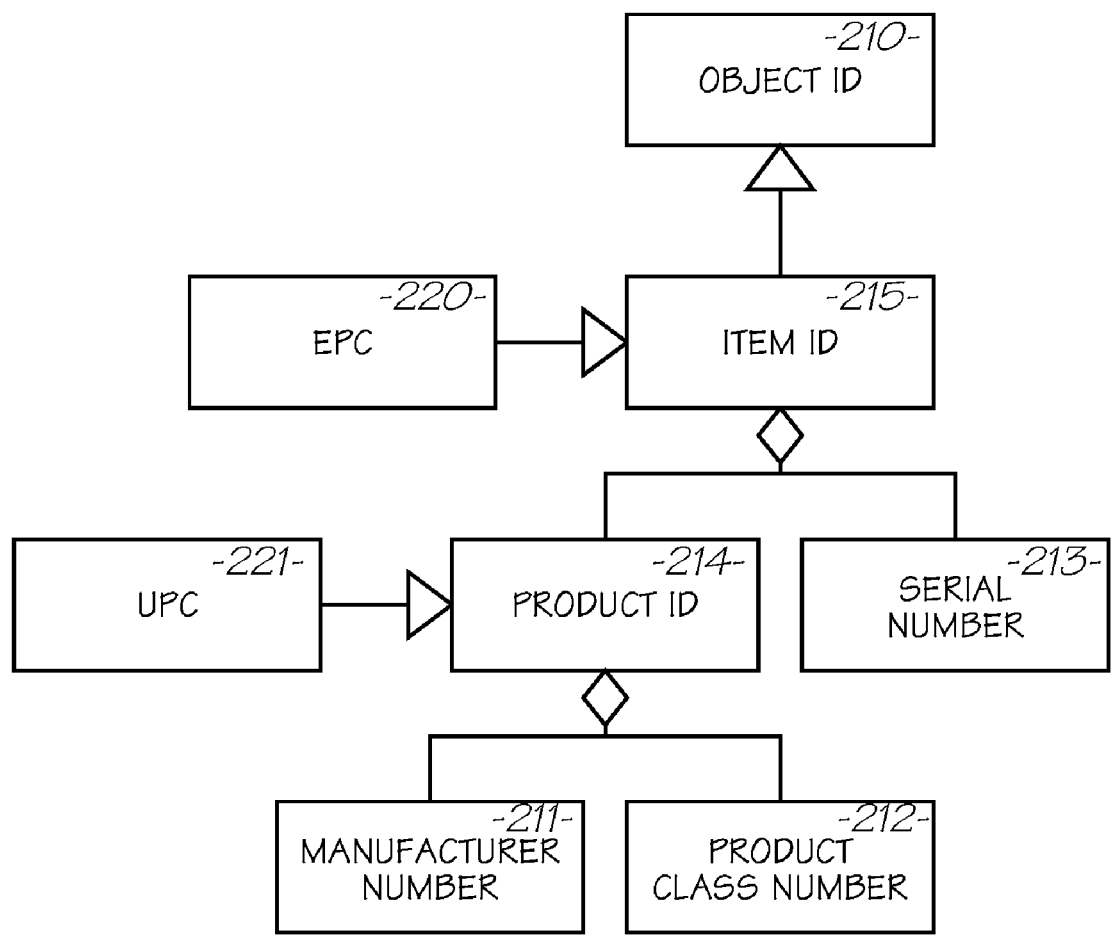
FIG. 13 shows a class diagram of an object ID.

As shown in FIG. 13, the identifier 210 can be considered as a general object identifier, whether it identifies a page, a region of a page, a specific object, or a specific item. In the latter case, the item identifier 215 may correspond to an electronic product code (EPC), consisting of a product identifier 214 and a serial number 213. The product identifier may correspond to a Universal Product Code (UPC). The product identifier may consist of a manufacturer number 211 and a product class number 212.

A netpage printer 601 comprises a controller 656, a printhead 350, and one or more replaceable ink cartridges 2003. A netpage printer 601 utilizes one or more print cartridges 2003 which may contain black ink, colored ink (e.g. cyan, magenta, yellow), fixative, and adhesive 2005. Each cartridge 2003 typically incorporates a quality assurance (QA) chip 761 which contains information about ink characteristics and available ink volume, and which is used to record ink consumption during printing to prevent printheads 350 from running dry and being damaged.

The netpage printer 601 typically utilizes invisible ink for printing coded data, in which case at least one cartridge 2003 includes invisible ink. The invisible ink may be a near-infrared-absorptive ink.

It is advantageous for a netpage system to use unique identifiers for identifying regions (or pages), to allow user interactions with different regions (or pages) to be distinguished by the system. This may apply to regions (or pages) with different descriptions, or to different instances of the same regions (or pages), or to different object (or function) identifiers, or to different instances of the same object (or function) identifiers.

When all the participants of a netpage system are connected, it is a trivial matter to allocate identifiers in such a way as to guarantee global uniqueness. For example, a central database of identifiers may be used. However, when all the participants of a netpage system are not connected, the allocation of unique identifiers presents a problem. For example, when netpage systems are deployed on multiple networks, it is desirable for identifiers allocated within any network to be unique across all networks to prevent accidental misinterpretation by a computer on one network of input received via a page printed on another network.

Figure 6:
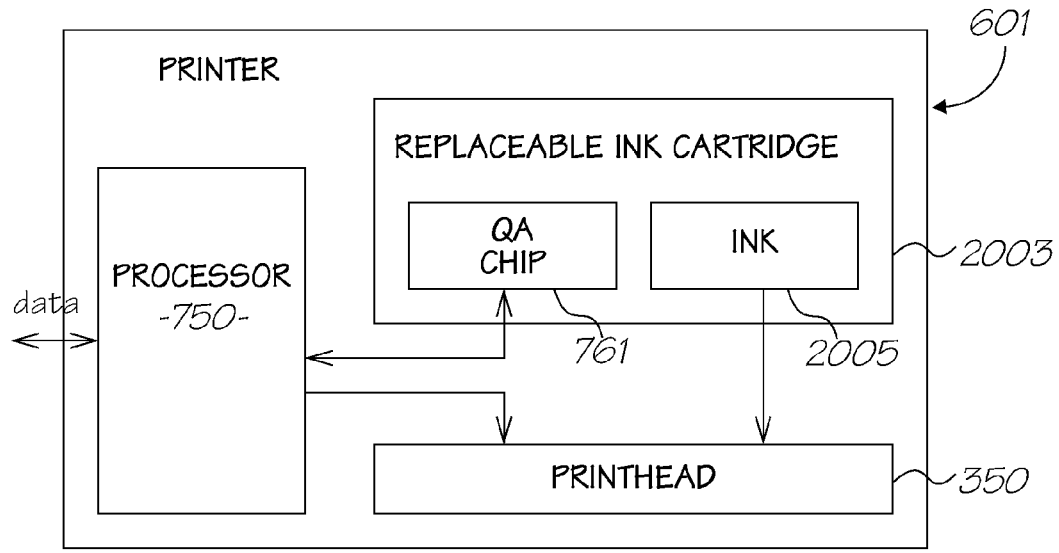
FIG. 6 shows a schematic block diagram of a printer with ID data stored in the ink cartridge.

As shown in FIG. 6, to allow allocation of globally unique identifiers, identifiers can be centrally allocated and stored in netpage cartridges 2003 during or after the cartridge manufacturing process. The QA chip 761 in a netpage printer cartridge 2003 provides a convenient non-volatile memory (in the form of a flash memory) capable of holding a range of unique identifiers (examples of the QA chip are the subject of granted U.S. Pat. Nos. 6,374,354 and 7,631,190, entitled "Use of variant base keys with two entities"). Ideally, the cartridge 2003 which contains the machine-readable ink 2005 used for printing coded data also holds the identifier range. This allows the size of the pre-allocated identifier range (or set) to be tuned to the maximum number of pages printable using the available volume of machine-readable ink. Another non-volatile memory in the cartridge can be used in place of the QA chip's memory.

As an alternative, a pre-allocated identifier range (or set) can be provided to the printer separately from other consumables, e.g. in the form of a flash memory card, read-only memory (ROM) card, optical card, magnetic stripe card, smart card, or any combination of these. Such a card may of course come in any number of form factors, including a chip, a card, and cartridge. It is then practical to have a computer system 2009 on the network 2012, rather than a printer, manage identifier allocation from the card.

It will be appreciated that the term "cartridge" is meant to encompass all conceivable form factors, and is not intended in a limiting sense except as to indicate an object which can be inserted into a computer system 2009 or printer 601 for the purposes of being read (and possibly written), possibly but not necessarily in conjunction with the extraction of other consumable materials.

Figure 8:
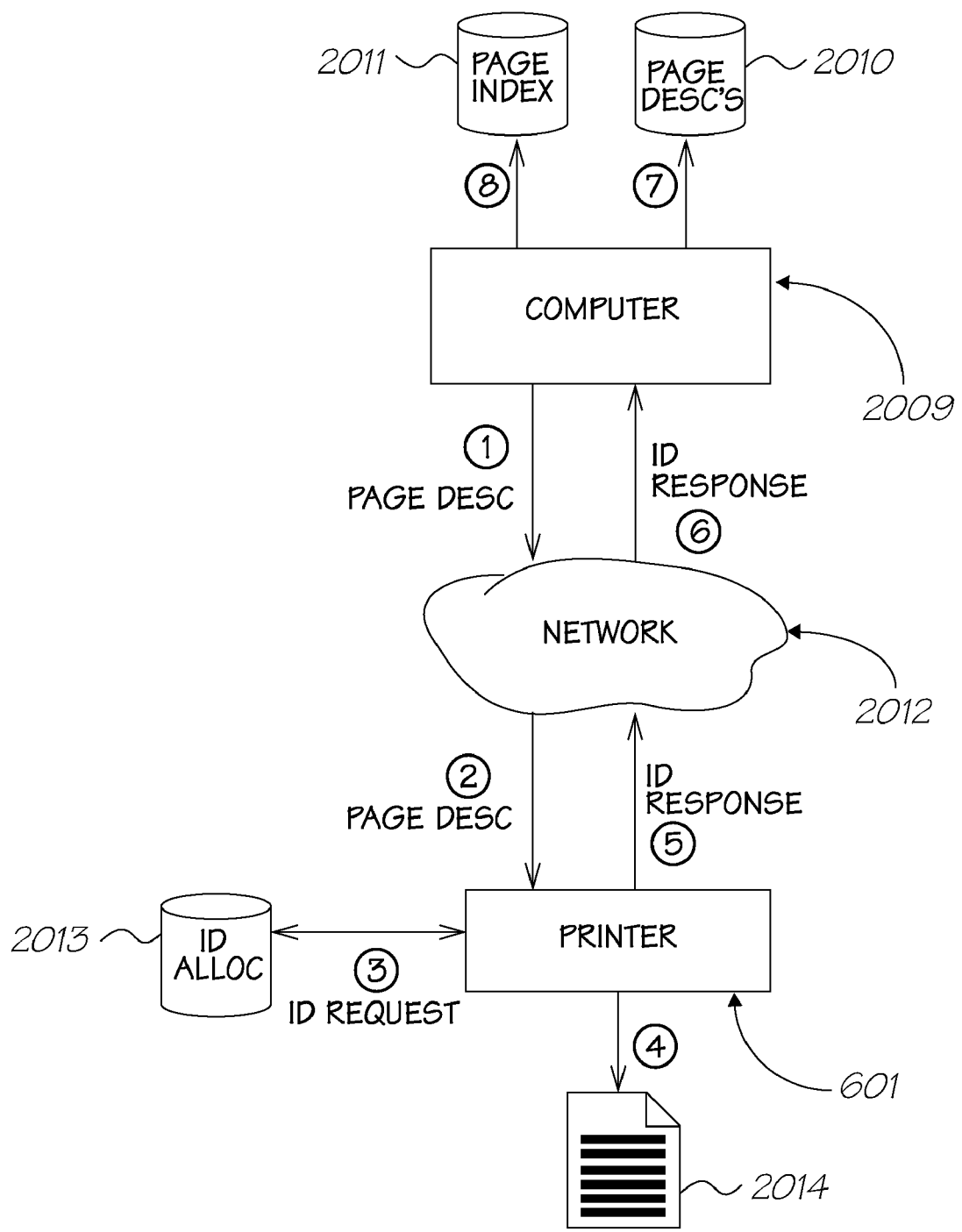
FIG. 8 shows a flowchart of a printer allocating the next ID from the ink cartridge, on receipt of print data.

As shown in FIG. 8, each time the netpage printer 601 requires a unique identifier, e.g. when it prints a page in response to print data received from a computer system, it reads the next available identifier from the cartridge 2003, and increments the next available identifier. This ensures that the same identifier is only used once. In practice, this is advantageously done by way of decrementing a count of available identifiers relative to a static base identifier. In the preferred embodiment, the printer 601 then communicates the identifier to the computer system 2009 to allow the computer system to record an association between the page description 2010 and the identifier in an index 2011. If region (or page) identification is implicit via a unique fragment of a larger coordinate grid, then the allocated (and communicated) "identifier" consists of a range of two-dimensional addresses, where the range identifies the coordinate grid fragment and thus the region (or page).

A number of schemes may be used to represent a collection of identifiers. A range may be represented by a base identifier and a count. The count may be omitted and the range may instead be limited by the physical ink capacity of the cartridge. A range or set of identifiers may be represented explicitly.

The identifiers may also be generated algorithmically. For example, successive identifiers may be generated recursively, by feeding back at least a portion of a current identifier into an algorithm to generate the next identifier.

One way of implementing recursive generation is by using a linear feedback shift register (LFSR). An LFSR of length k consists of k 1-bit stages numbered 0 to k−1. On each clock the content of stage 0 forms the next bit of the output sequence, the content of stage i is moved to stage i−1, and the new content of stage is a feedback bit calculated by adding together modulo 2 the previous contents of a fixed subset of the stages of the register (see Menezes, A. J., P. C. van Oorschot and S. A. Vanstone, *Handbook of Applied Cryptography*, 1997, CRC Press).

A maximal-length LFSR produces as output a so-called m-sequence with a length of $(2^k)-1$, in which every possible non-zero register value appears once before the sequence repeats. M-sequences are also known as pseudo-noise (PN) or pseudo-random sequences, since they exhibit many of the general characteristics of noise without actually being random. The characteristics and construction of PN sequences are discussed extensively in Golomb, S. W., *Shift Register Sequences*, Aegean Park Press, 1982. In practice, a collection of identifiers can be represented by a base identifier and optionally a count. The base identifier then forms the initial contents of the LFSR.

A number of schemes may also be used to record the consumption of identifiers. The base identifier may simply be incremented, decremented or re-written. The associated count, if present, may be decremented. Alternatively a usage count may be incremented. If the identifier information is recorded in a read-only medium, then a separate usage count is useful. Usage consumption may also be physically recorded, e.g. by the length of a line or of a collection of marks incrementally recorded on the cartridge.

Figure 9:
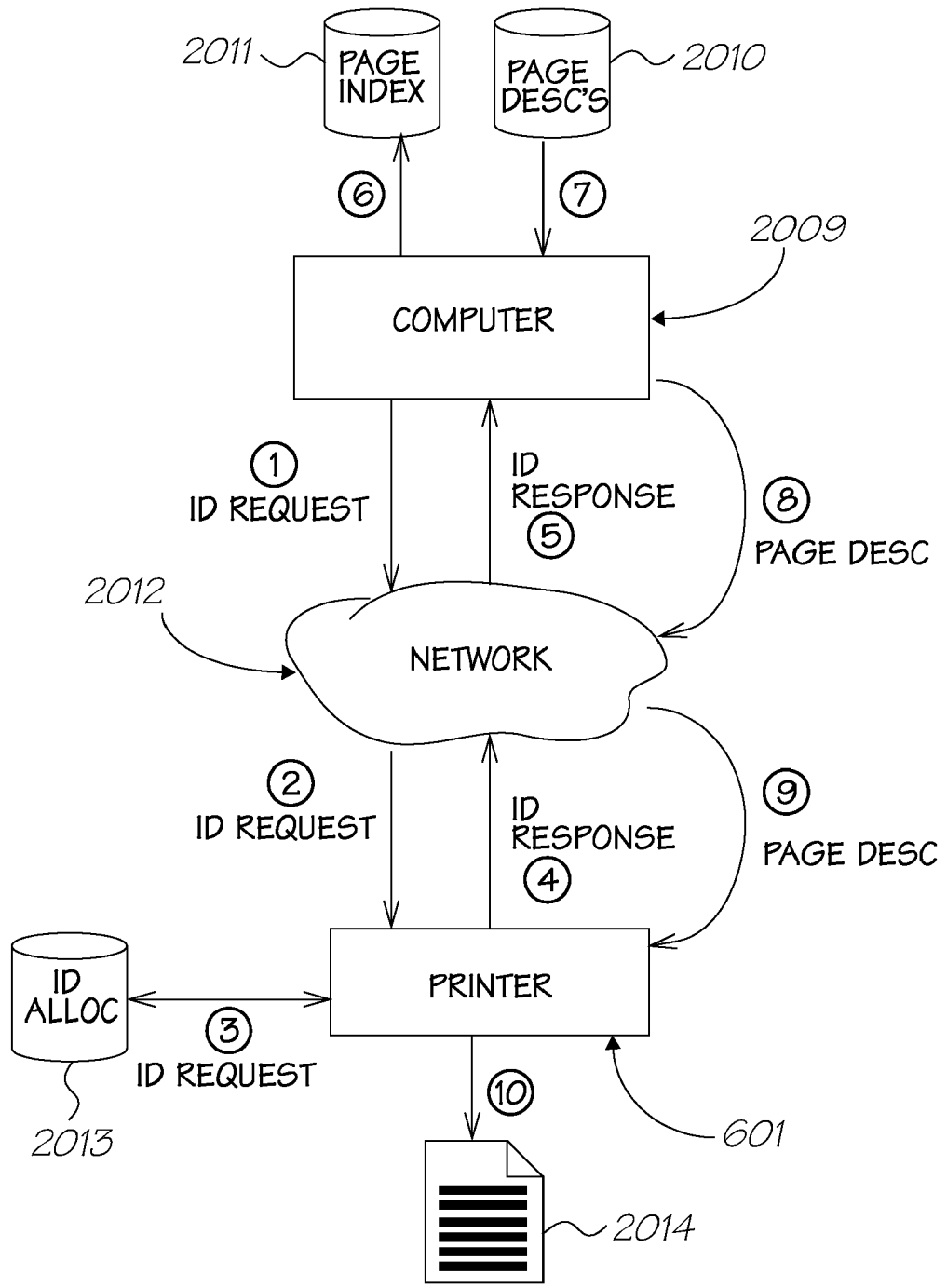
FIG. 9 shows a flowchart of a computer requesting the ID from the printer prior to sending print data.

The allocation of an identifier from the cartridge 2003 may, from the printer's point of view, be decoupled from printing. The printer 601 may, for example, respond to a request from a computer system 2009 for one or more identifiers, which the computer system then allocates to one or more regions (or pages) 2010 prior to sending print data to the printer, as shown in FIG. 9. The print data may then include the identifiers. Identifiers allocated from a cartridge 2003 may include identifiers which are used by the computer system 2009 to index document, page, region and object data, but which are never included in coded data printed by the (or any other) printer.

Figure 7:
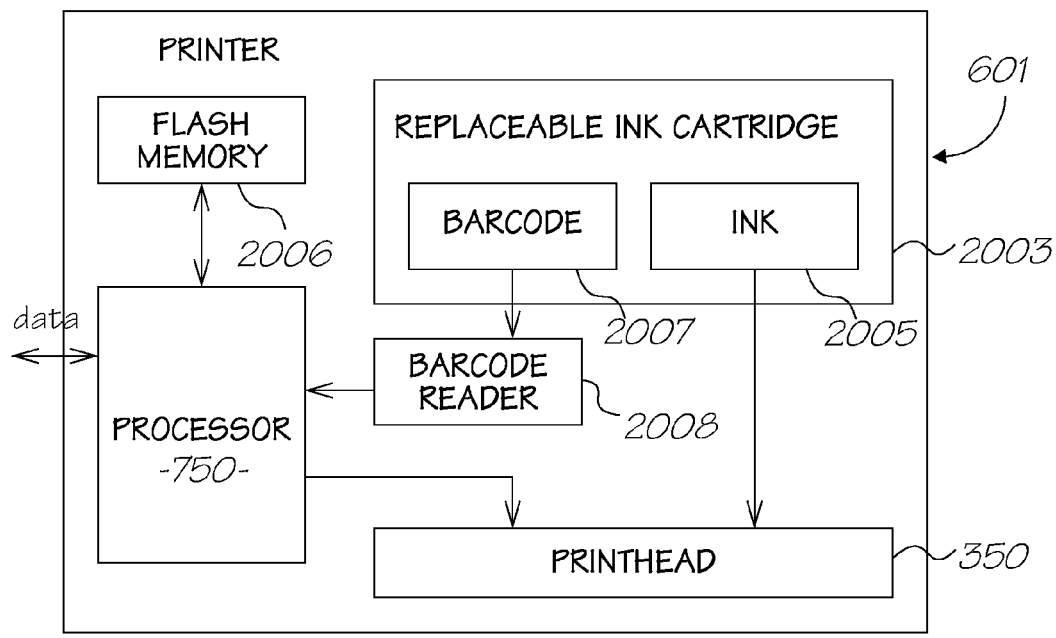
FIG. 7 shows a schematic block diagram of a printer with ID data encoded on the surface of the ink cartridge.
Figure 10:
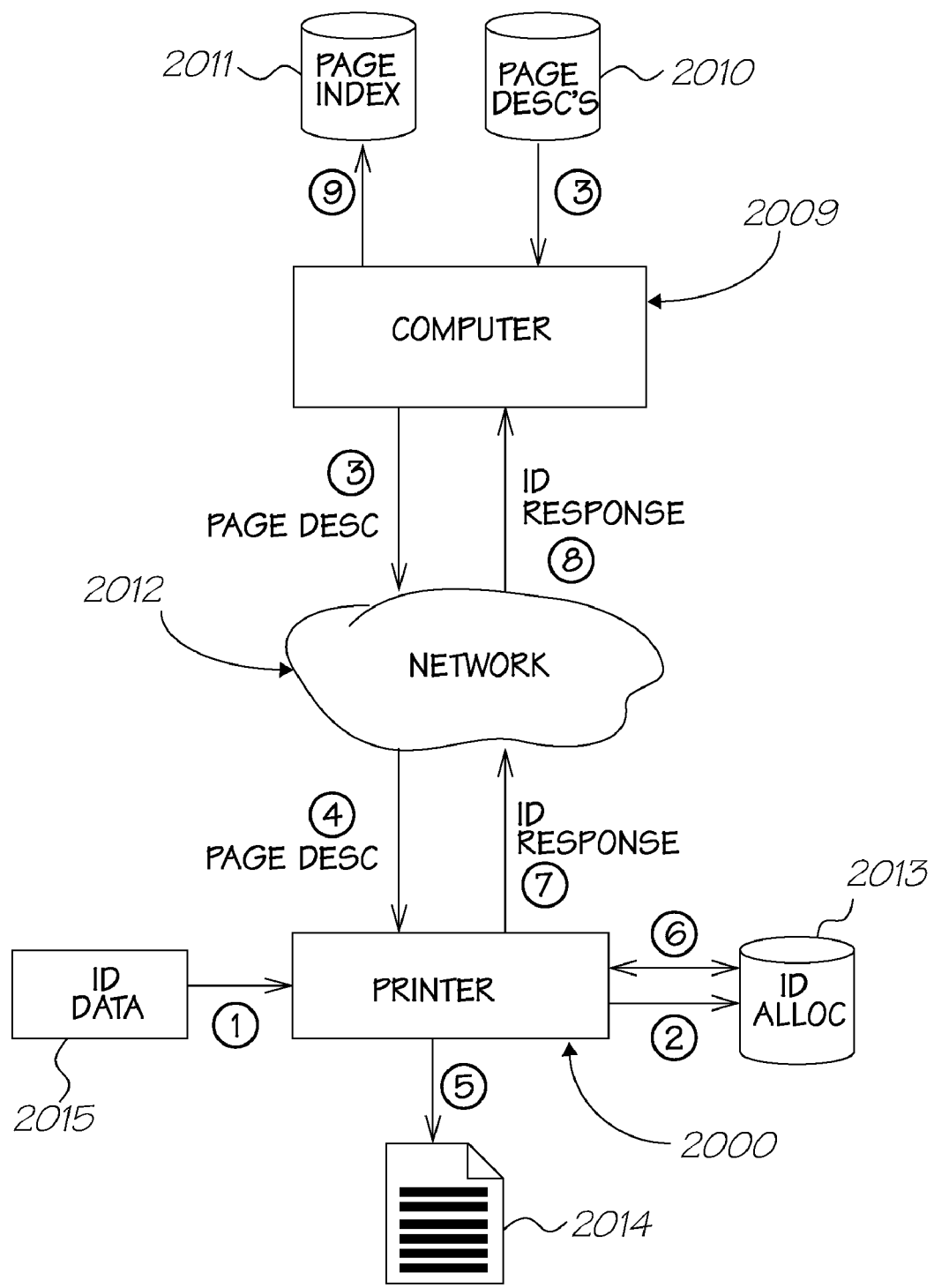
FIG. 10 shows a flowchart of a printer reading ID data from the ink cartridge and maintaining the ID allocation internally.
Figure 11:
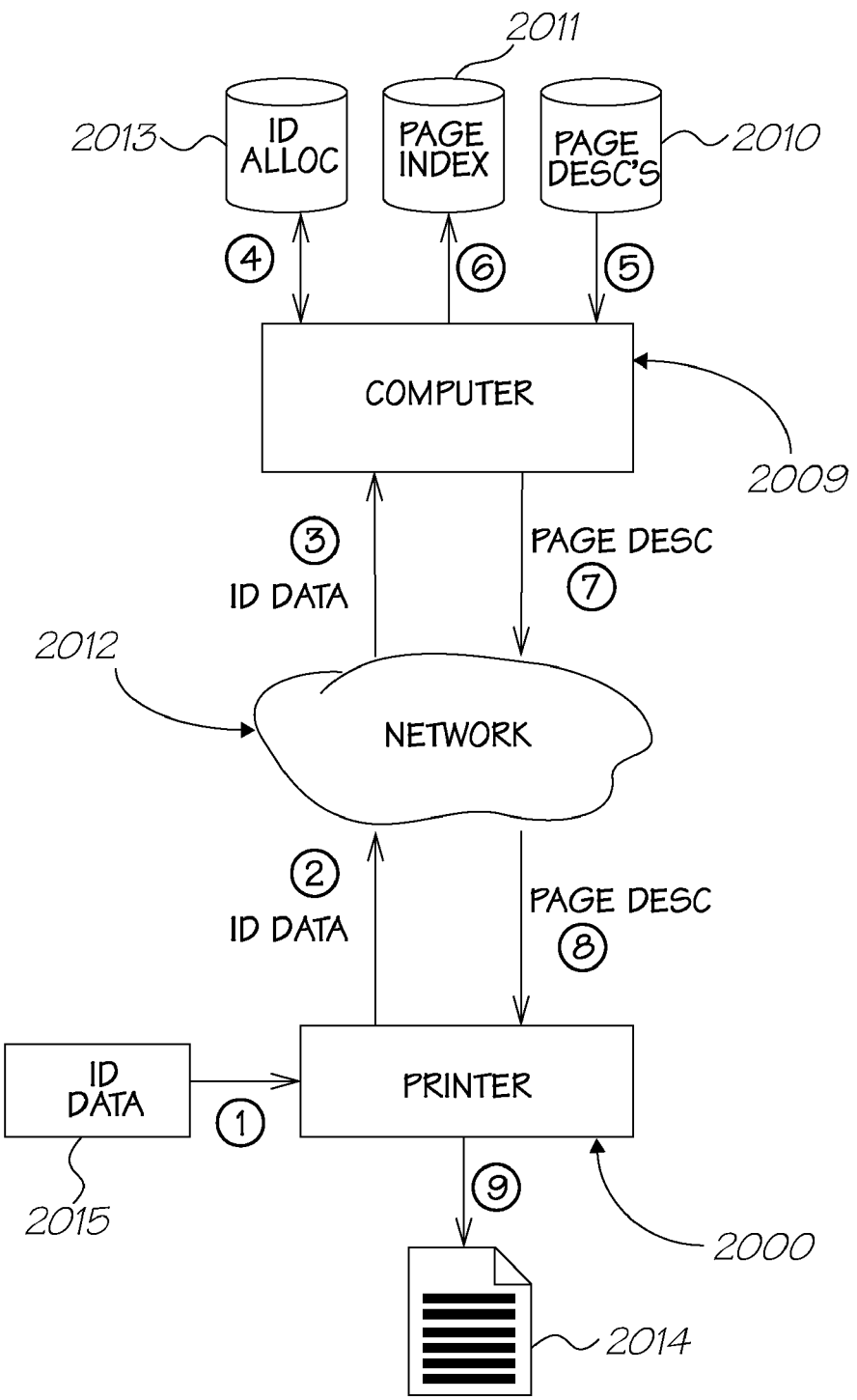
FIG. 11 shows a flowchart of a computer maintaining ID allocation after obtaining the ID data from the printer.
Figure 12:
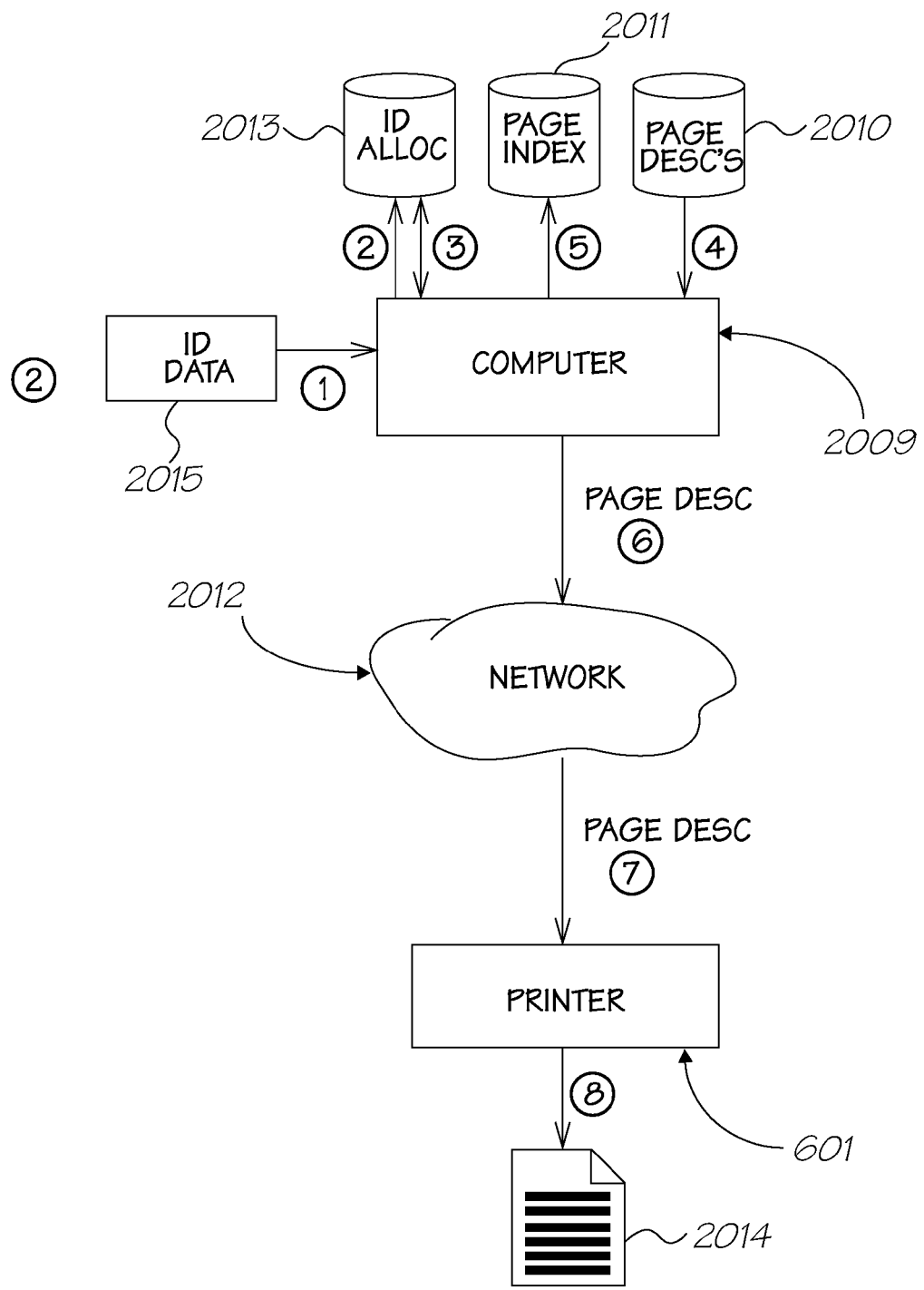
FIG. 12 shows a flowchart of a computer maintaining ID allocation after obtaining the ID data from the printer; ands

The netpage print cartridge 2003 may provide identifiers 2015 in another machine-readable form, such as in the form of an optical or magnetic encoding which can be sensed and decoded by the printer. For example, the identifier data 2015 may be coded in a linear or two-dimensional barcode 2007 on the surface of the cartridge, which is read by a barcode reader 2008 embedded in the printer 601, as shown in FIG. 7. If the cartridge lacks re-writable memory entirely (e.g. in the absence of QA-chip flash memory), then the printer 601 can maintain identifier consumption data in its own memory 2006, or on its own disk 2013, as shown in FIG. 10, or on a computer system 2009 to which it has access, or a computer system can maintain identifier consumption data 2013 for a cartridge 2003 to which the printer 601 provides it with access, as shown in FIG. 11. Although largely practical, these approaches have the disadvantage that if a partially-used cartridge is moved from one netpage network to another (or even from one printer to another on the same network), then duplicate identifier usage may result. Alternatively, the printer 601 can maintain identifier consumption data on the cartridge, but recorded in a different manner to the identifier data itself. For example, the identifier data may be recorded in read-only form using any of the approaches described above, and the printer may read and write (or re-write) identifier consumption data separately, e.g. via a optical reader for reading consumption-indicative marks or data on the cartridge and a printer (or other marking device) for printing (or otherwise placing) consumption-indicating marks or data onto the cartridge, or via a magnetic reader and writer for reading consumption-indicating data from and writing consumption-indicating data to a magnetic medium on the cartridge.

However the identifiers are stored in or on the cartridge, it is preferred that some form of encryption be used. Encryption prevents unauthorized tampering with the information stored on the cartridge, which is important if it is desirable to keep the identifiers globally unique across many printers and computer systems. Where the identifiers have commercial value, encryption impedes unauthorized generation of unpaid-for identifiers by end users.

A suitable encryption scheme is a public-private key arrangement, whereby the identifier information on or in the cartridge is encrypted at some point during manufacture or distribution using a private key. The printer (or computer system) is provided with the public key corresponding to the private key, enabling it to decrypt the identifier information from the cartridge prior to use. Alternatively, the identifier information may be encrypted using a secret key also known to the printer.

Rather than being encrypted, the identifier information may be stored in the clear but may have an associated digital signature. The printer can verify the digital signature with respect to the identifiers to thereby authenticate the identifier information. The digital signature may have been generated during manufacture or distribution using a secret key or a private key, and the printer may verify the digital signature using respectively the same secret key or a public key associated with the private key.

Whether the identifier information is encrypted or digitally signed using a secret key, the secret key may be securely stored in a master QA chip embedded in the printer.

An example of a netpage printer 601 is described in more detail below.

Printer Mechanics

Figure 1:
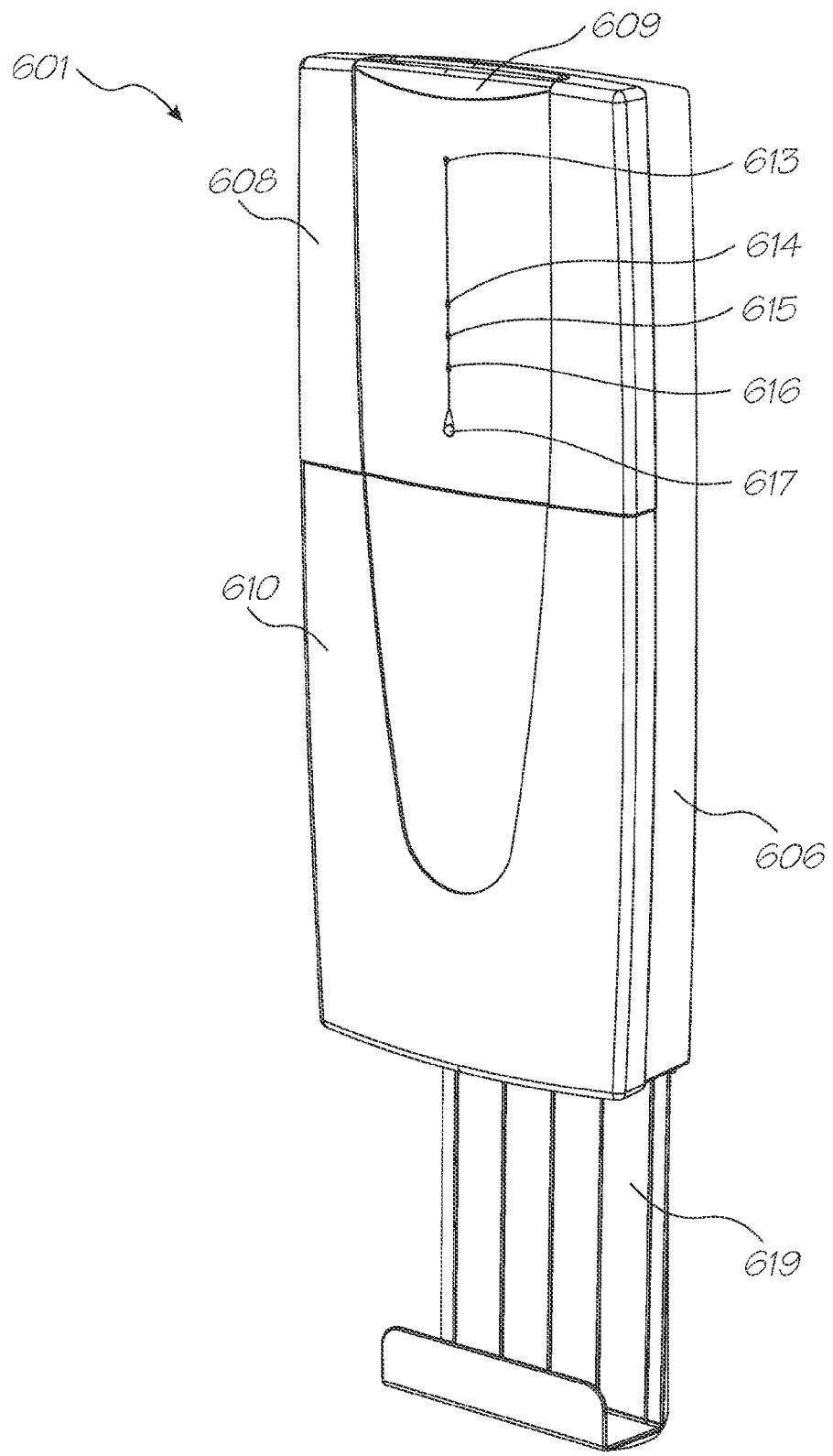
FIG. 1 shows a perspective view of a wall-mounted printer.
Figure 2:
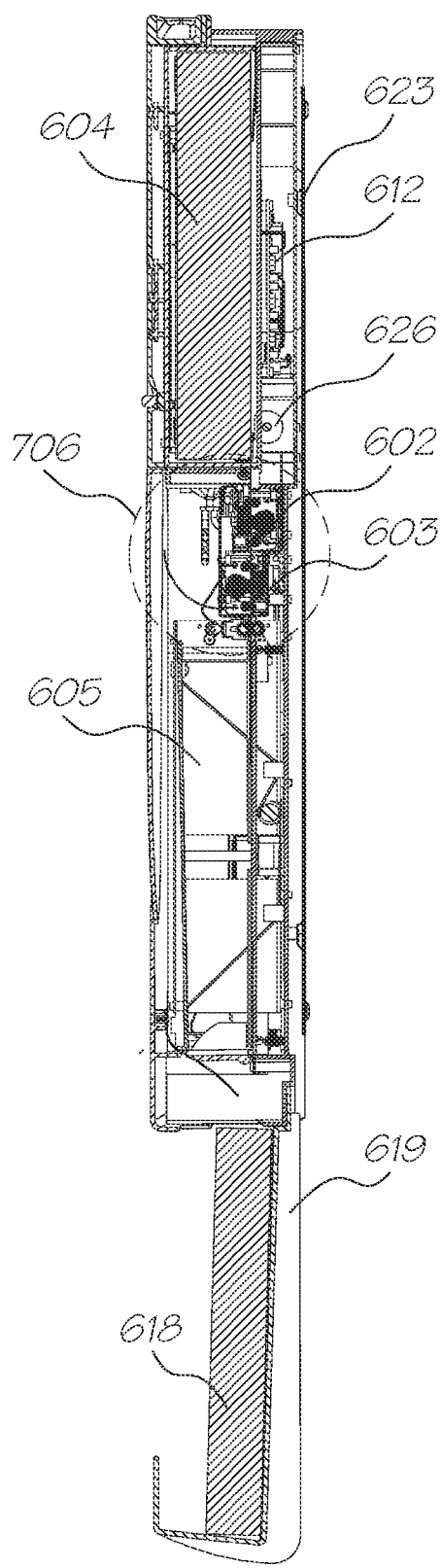
FIG. 2 shows a section through the length of the printer of FIG. 1.
Figure 2A:
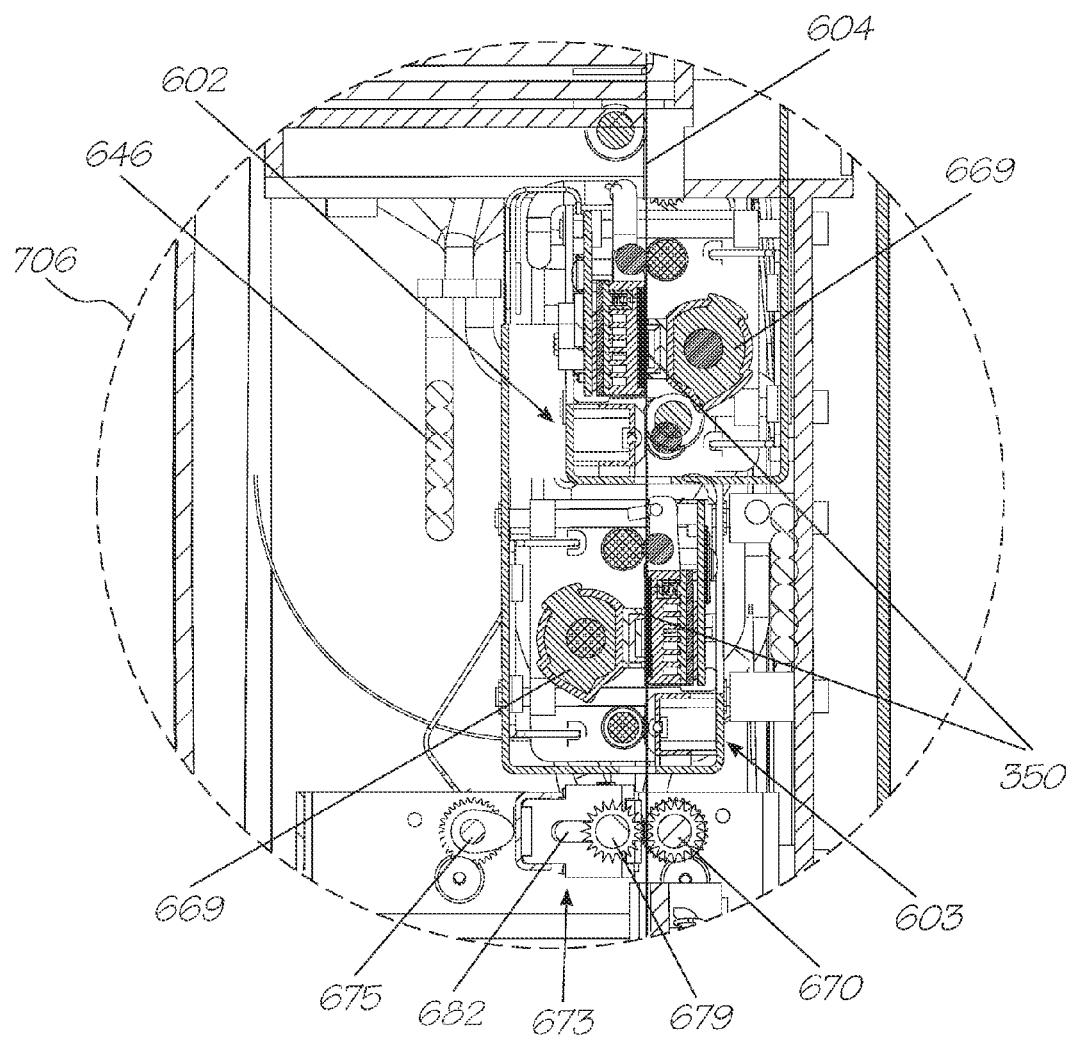
FIG. 2A shows an enlarged portion of FIG. 2 showing a section of the duplexed print engines and glue wheel assembly.

The vertically-mounted netpage wallprinter 601 is shown fully assembled in FIG. 1. It prints netpages on Letter/A4 sized media using duplexed 8½" Memjet™ print engines 602 and 603, as shown in FIGS. 2 and 2a. It uses a straight paper path with the paper 604 passing through the duplexed print engines 602 and 603 which print both sides of a sheet simultaneously, in full color and with full bleed.

An integral binding assembly 605 applies a strip of glue along one edge of each printed sheet, allowing it to adhere to the previous sheet when pressed against it. This creates a final bound document 618 which can range in thickness from one sheet to several hundred sheets.

Figure 3:
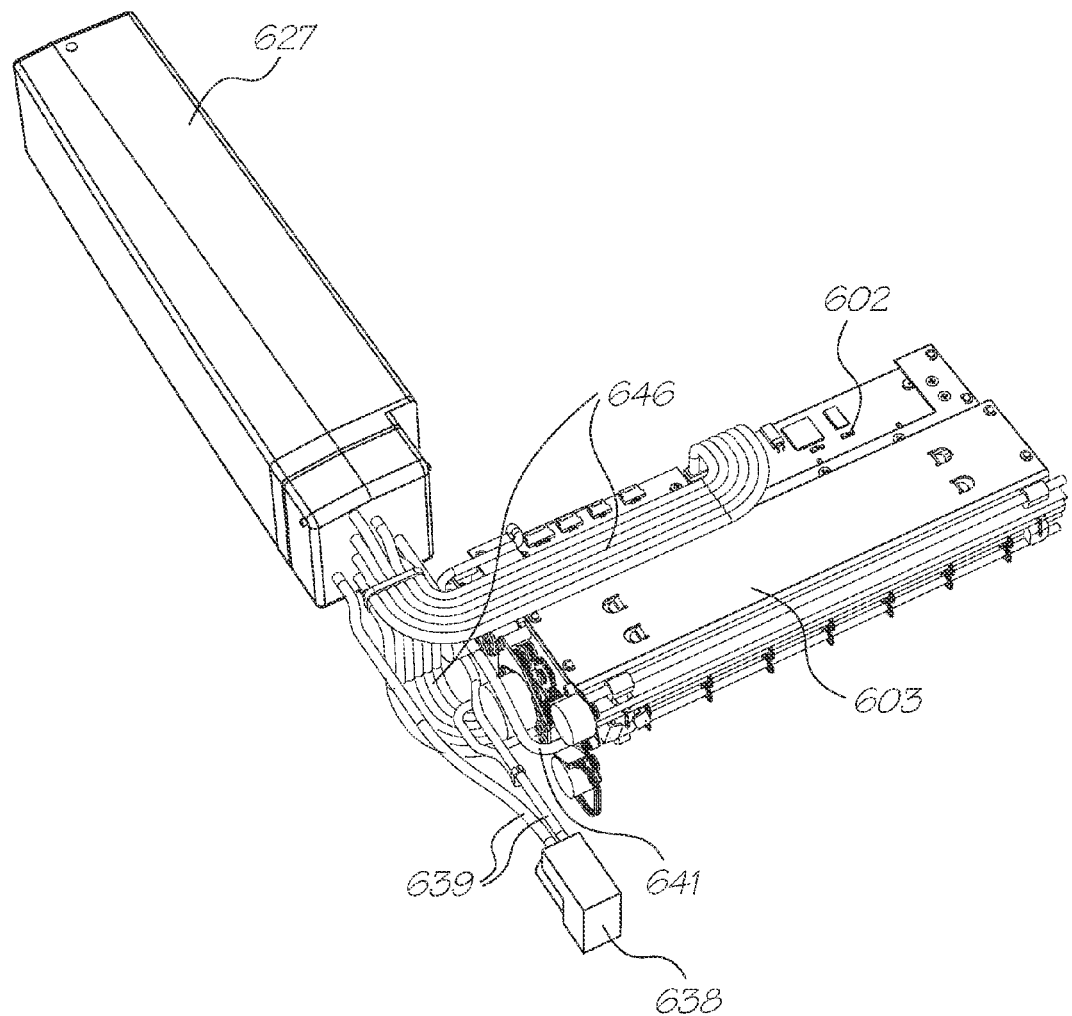
FIG. 3 shows a detailed view of the ink cartridge, ink, air and glue paths, and print engines of the printer of FIGS. 1 and 2.

The replaceable ink cartridge 627, shown in FIG. 3 coupled with the duplexed print engines, has bladders or chambers for storing fixative, adhesive, and cyan, magenta, yellow, black and infrared inks. The cartridge also contains a micro air filter in a base molding.

Referring to FIG. 2, the motorized media pick-up roller assembly 626 pushes the top sheet directly from the media tray past a paper sensor on the first print engine 602 into the duplexed Memjet™ printhead assembly. The two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences. Fixative is printed simultaneously to aid drying in the shortest possible time.

The paper exits the first Memjet™ print engine 602 through a set of powered exit spike wheels (aligned along the straight paper path), which act against a rubberized roller. These spike wheels contact the printed surface and continue to feed the sheet 604 into the second Memjet™ print engine 603.

Referring to FIGS. 2 and 2a, the paper 604 passes from the duplexed print engines 602 and 603 into the binder assembly 605. The printed page passes between a powered spike wheel axle 670 with a fibrous support roller and another movable axle with spike wheels and a momentary action glue wheel. The movable axle/glue assembly 673 is mounted to a metal support bracket and it is transported forward to interface with the powered axle 670 via gears by action of a camshaft. A separate motor powers this camshaft.

The glue wheel assembly 673 consists of a partially hollow axle 679 with a rotating coupling for the glue supply hose 641 from the ink cartridge 627. This axle 679 connects to a glue wheel, which absorbs adhesive by capillary action through radial holes. A molded housing 682 surrounds the glue wheel, with an opening at the front. Pivoting side moldings and sprung outer doors are attached to the metal bracket and hinge out sideways when the rest of the assembly 673 is thrust forward. This action exposes the glue wheel through the front of the molded housing 682. Tension springs close the assembly and effectively cap the glue wheel during periods of inactivity.

As the sheet 604 passes into the glue wheel assembly 673, adhesive is applied to one vertical edge on the front side (apart from the first sheet of a document) as it is transported down into the binding assembly 605.

Printer Controller Architecture

Figure 4:
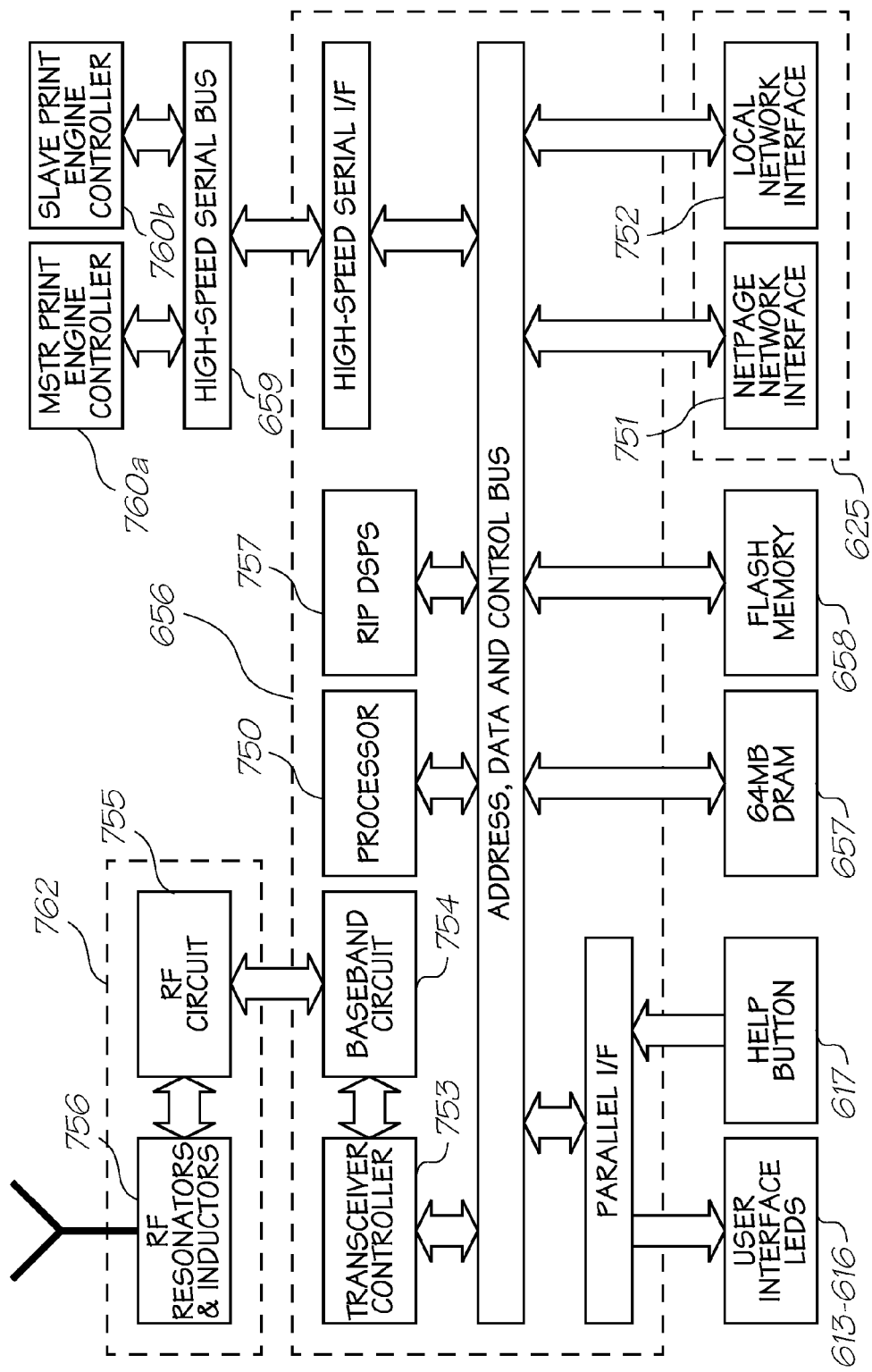
FIG. 4 shows a schematic block diagram of a printer controller for the printer shown in FIGS. 1 and 2.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760a and 760b, flash memory 658, and 64 MB of DRAM 657, as illustrated in FIG. 4.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

Figure 5:
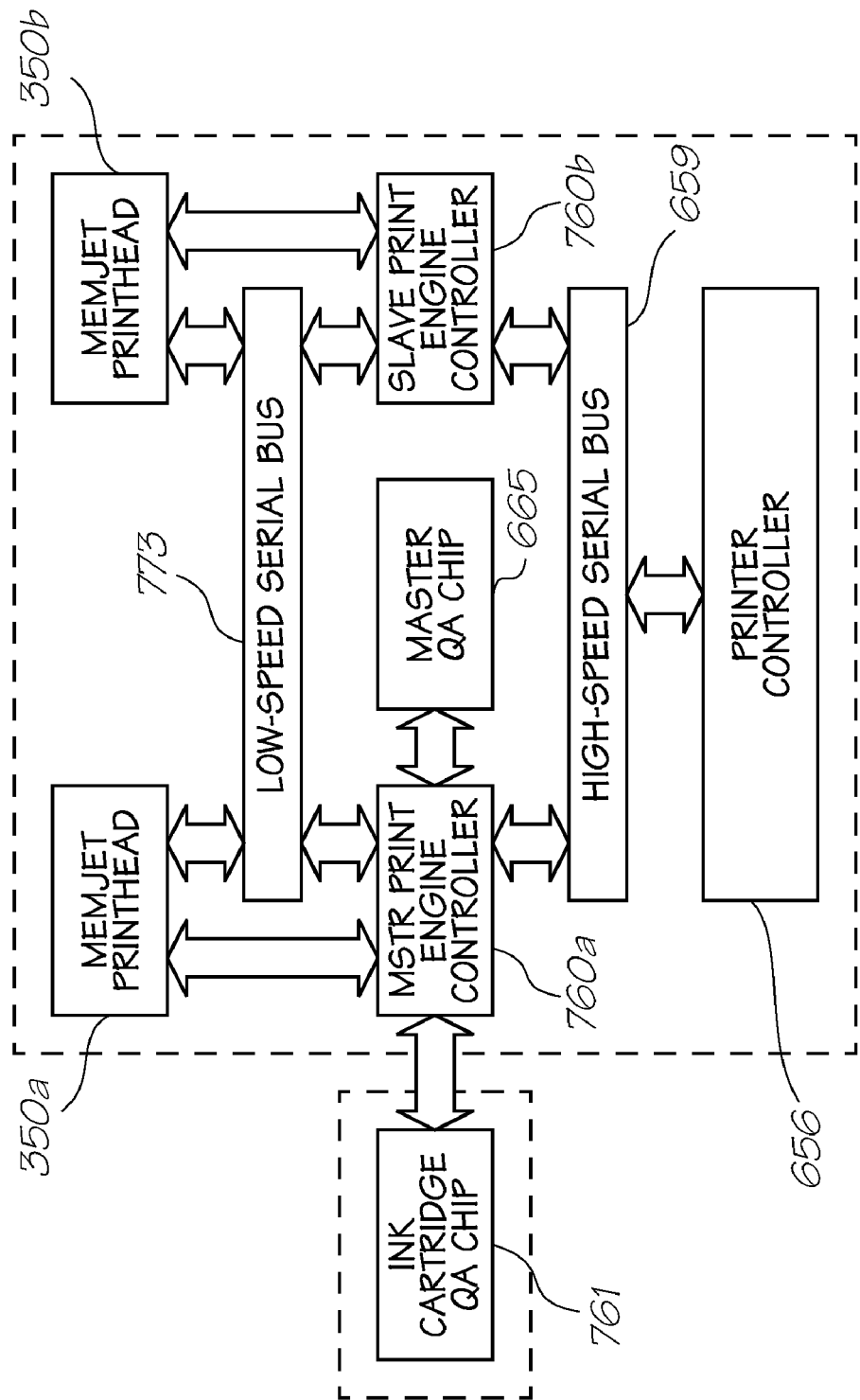
FIG. 5 shows a schematic block diagram of duplexed print engine controllers and printheads associated with the printer controller shown in FIG. 4.

The master print engine controller 760a controls the paper transport and monitors ink usage in conjunction with the master QA chip 665 and the ink cartridge QA chip 761, as shown in FIG. 5.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2×256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. Netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

Rasterization and Printing

Once the main processor 750 has received and verified the document's page layouts and page objects, it runs the appropriate RIP software on the DSPs 757.

The DSPs 757 rasterize each page description and compress the rasterized page image. The main processor stores each compressed page image in memory. The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory, and starts the page expansion and printing pipeline. Page expansion and printing is pipelined because it is impractical to store an entire 114 MB bi-level CMYK+IR page image in memory.

Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK-FIR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

Printing Product Labels and Packaging

The printer 601, or a variant thereof, may be used to print product codes, product information and product graphics onto the label, packaging or actual surface of a product before, during or after its manufacture and/or assembly.

The printer may be an add-on infrared printer which prints barcodes and/or netpage tags after text and graphics have been printed by other means, or an integrated color and infrared printer which prints the omnitags, text and graphics simultaneously. Digitally-printed text and graphics may include everything on the label or packaging, or may consist only of the variable portions, with other portions still printed by other means. Thus the printer with an infrared and black printing capability can displace an existing digital printer used for variable data printing, such as a conventional thermal transfer or inkjet printer.

The printer is typically controlled by a host computer, which supplies the printer with fixed and/or variable text and graphics as well as item ids for inclusion in the omnitags. The host may provide real-time control over the printer, whereby it provides the printer with data in real time as printing proceeds. As an optimisation, the host may provide the printer with fixed data before printing begins, and only provide variable data in real time. The printer may also be capable of generating per-item variable data based on parameters provided by the host. For example, the host may provide the printer with a base item ID prior to printing, and the printer may simply increment the base item ID to generate successive item ids. Alternatively, memory in the ink cartridge or other storage medium inserted into the printer may provide a source of unique item ids, in which case the printer reports the assignment of items ids to the host computer for recording by the host.

Alternatively still, the printer may be capable of reading a pre-existing item ID from the label onto which the omnitags are being printed, assuming the unique ID has been applied in some form to the label during a previous manufacturing step. For example, the item ID may already be present in the form of a visible 2D bar code, or encoded in an RFID tag. In the former case the printer can include an optical bar code scanner. In the latter case it can include an RFID reader.

The printer may also be capable of rendering the item ID in other forms. For example, it may be capable of printing the item ID in the form of a 2D bar code, or of printing the product ID component of the item ID in the form of a linear bar code, or of writing the item ID to a writable or write-once RFID tag.

The invention has been described herein with reference to the specific examples only. Skilled workers in this field will readily recognize many variations and modifications, which do not depart from the spirit and scope of the broad inventive concept.

Furthermore, it will be appreciated by a person skilled in the art that the cartridge disclosed in the present application may be implemented or used in any printing device where the printing device uses a cartridge. For example, the printing device may be a desktop printer, a workgroup printer, a network printer, a short-run digital printer, or a printer integrated in a mobile device such as a personal digital assistant or a mobile or cellular phone. Such devices and printers are the subject of granted US patents and co-pending US patent applications, details of which are provided in the cross reference section of the present specification.

We claim:

1. A printer system for printing pages belonging to an interactive page system, the printer system comprising:
   a cartridge comprising a data storage area in which is pre-stored a range of identifiers, each identifier being unique throughout the interactive page system; and
   a printer comprising an interface for receiving the cartridge, a reader for reading an identifier from the range of pre-stored identifiers, a coded data generator for generating a page identifier from the identifier, and a printing mechanism for printing the page identifier onto a page,
   wherein the reader reads a previously unread identifier from the range of identifiers each time the coded data generator is to generate a page identifier, and wherein the printing mechanism repeatedly prints the page identifier over substantially an entirety of the page.

2. A printer system according to claim 1, wherein the range of identifiers is defined by a base identifier and a count.

3. A printer system according to claim 2, wherein the reader reduces the count to ensure a previously unread identifier is read.

4. A printer system according to claim 1, where in the cartridge further comprises one or more ink reservoirs for storing a printing fluid.

5. A printer system according to claim 4, wherein each of the one or more ink reservoirs contain one of black ink, coloured ink, infrared ink, a fixative, and an adhesive.

6. A printer system according to claim 4, wherein the range of identifiers is of a size sufficient to generate as many identifiers as pages printable using the printing fluid stored in the in the one or more reservoirs.

7. A cartridge according to claim 1, wherein the reader is an optical reader and the identifier data is disposed on the cartridge in an optically readable form.

8. A cartridge according to claim 1, wherein the reader is a magnetic reader and the identifier data is disposed in the cartridge in a magnetically readable form.

9. A cartridge according to claim 8, further comprising a magnetic writer for magnetically writing and rewriting the count disposed in the cartridge.

10. A printer system according to claim 1, wherein the reader comprises electronic reading circuitry, and the identifier data is incorporated in an electronic readable memory associated with the cartridge.

11. A printer system according to claim 10, wherein the memory is a non-volatile magnetic memory.

12. A printer system according to claim 10, wherein the memory is a solid-state memory.

13. A printer system according to claim 10, further comprising an electronic writer for electronically writing and rewriting the count in the memory.

14. A printer system according to claim 1, wherein the identifiers are encrypted using an encryption key.

15. A printer system according to claim 1, wherein the printing mechanism prints the page identifier at a plurality of locations on the page.

16. A printer system according to claim 2, wherein a plurality of cartridges are provided, and the range of identifiers stored in each cartridge begins from a different base count.

17. A printer system for printing a sub-set of pages belonging to a super-set of pages, the printer system comprising:
   a cartridge comprising a data storage area in which is pre-stored a range of identifiers, each identifier being unique throughout the super-set of pages; and
   a printer comprising an interface for receiving the cartridge, a reader for reading an identifier from the range of pre-stored identifiers, a coded data generator for generating a page identifier from the identifier, and a printing mechanism for printing the page identifier onto a page,
   wherein the reader reads a previously unread identifier from the range of identifiers each time the coded data generator is to generate a page identifier, and wherein the printing mechanism repeatedly prints the page identifier over substantially an entirety of the page.

* * * * *